United States Patent
Davidson

[15] 3,649,059
[45] Mar. 14, 1972

[54] REINFORCEMENT CLIP

[72] Inventor: John W. Davidson, 416 S. Main Street, Lewisburg, Ohio 45338

[22] Filed: Nov. 28, 1969

[21] Appl. No.: 880,775

[52] U.S. Cl. ..........................287/189.35, 24/73 BC, 85/5, 85/80, 287/20 R
[51] Int. Cl. ..........................................F16b 5/07
[58] Field of Search..............287/189.36 D, 189.36 C, 20 R, 287/23; 151/41.75; 24/73 MF, 73 SM, 81 C, 73 BC; 85/80, 5; 339/126, 128

[56] References Cited

UNITED STATES PATENTS

| | | | |
|---|---|---|---|
| 2,342,832 | 2/1944 | Borchers | 151/41.75 X |
| 2,464,405 | 3/1949 | Knaut, Jr. | 287/20 R X |
| 2,640,672 | 6/1953 | Bedford | 287/20 R X |
| 2,746,111 | 5/1956 | Chvosta | 24/73 HS |
| 3,084,962 | 4/1963 | Feuerbacher | 287/20 R |
| 3,314,465 | 4/1967 | Bien | 151/41.75 |
| 2,166,916 | 7/1939 | Lombard | 339/128 UX |
| 2,707,013 | 4/1955 | Flora et al. | 85/80 |

Primary Examiner—Reinaldo P. Machado
Assistant Examiner—Wayne L. Shedd
Attorney—William S. Pettigrew, Frederick M. Ritchie and Edward P. Barthel

[57] ABSTRACT

In the preferred form a reinforcement clip is composed of a small sheet of spring metal having a substantially flat central rectangular portion provided with an aperture. Spring arms extend from the center of opposite edges in the form of three-fourths of a triangular loop with the ends of the arms extending through the aperture and provided with outturned projecting ends adapted to engage the opposite ends in the opening of the sheet to be reinforced. The aperture of the clip receives a peg provided with a wire locking arrangement. The edges of the clip along side the spring arms are bent to form reinforcing flanges.

2 Claims, 4 Drawing Figures

Patented March 14, 1972

3,649,059

INVENTOR.
John W. Davidson
BY
Carl A. Stickel
ATTORNEY

REINFORCEMENT CLIP

Walls which are made of very thin metal or relatively weak nonmetallic materials such as plastics, papers and other compositions, frequently are not strong enough in the area around the apertures for fastening and supporting devices intended for heavy loads. While there have been attempts to solve this problem in numerous ways none have achieved sufficient simplicity in design and construction or ease of application and none are sufficiently low in cost to provide a wholly satisfactory solution.

It is an object of this invention to provide for the area surrounding an aperture in a wall or sheet, a reinforcement clip having unusually resilient spring arms by which the clip can be readily attached to the edges of the aperture in the wall or sheet.

Further objects and advantages of the present invention will be apparent from the following description, reference being had to the accompanying drawings, wherein preferred embodiments of the present invention are clearly shown.

Figure 1:
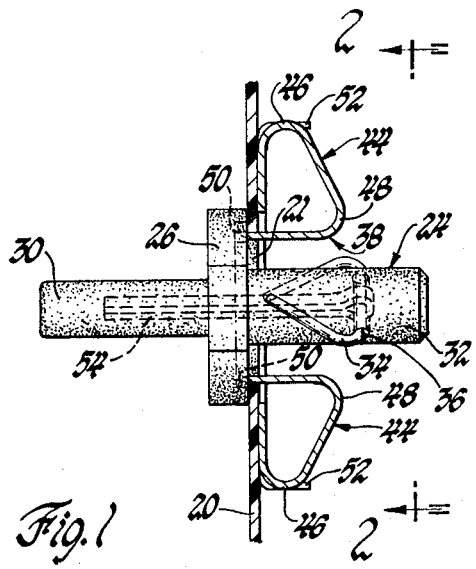
FIG. 1 is a sectional view through a reinforcement clip embodying one form of my invention applied to a thin plastic wall containing a registering aperture and receiving a peg.
Figure 2:
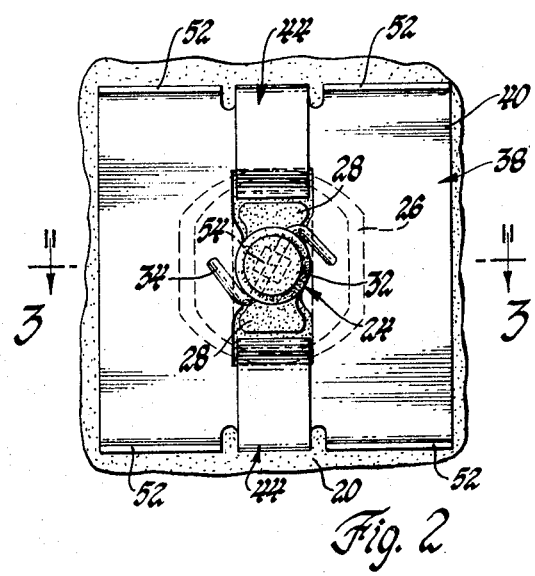
FIG. 2 is a right side view of FIG. 1 as indicated by the arrows 2—2 in FIG. 1.
Figure 3:
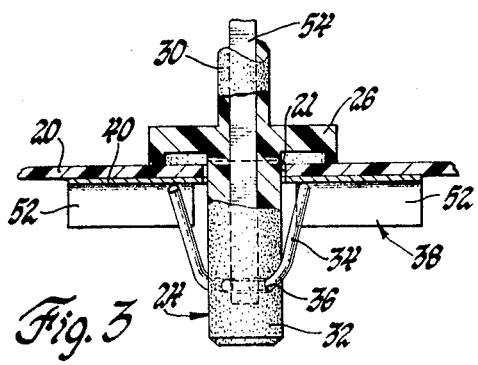
FIG. 3 is a horizontal sectional view taken along the line 3—3 of FIG. 2.
Figure 4:
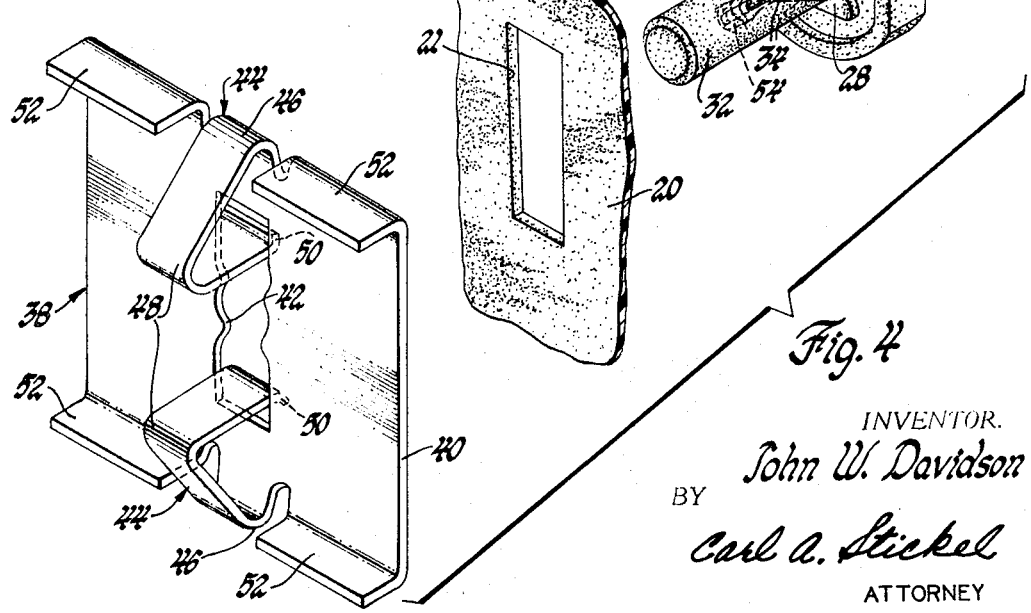
FIG. 4 is an exploded perspective view of the reinforcement clip, wall portion and peg.

Referring now to the drawings, there is shown a thin plastic wall portion 20 containing an aperture 21 which is provided for the purpose of receiving a peg 24 which is intended to assist in supporting a shelf or other device upon the wall 20. The peg 24 includes a central flange portion 26 provided with a two arm projection 28 raised on the concealed side thereof. The supporting peg portion 30 extends from the exposed surface side of the flange 26 for the purpose of supporting a shelf or other device. Extending from the opposite side of the flange 26 is an anchoring pin portion 32 which is provided with a U-shaped wire lock 34 in which the yoke of the U-shape extends through a transverse aperture 36 in the anchoring pin portion 32. Both peg portions are generally cylindrical. The peg 24 has embedded in its plastic material a hair pin shaped reinforcement 54 which is looped around the yoke of the wire lock 34 and extends therefrom along the axis of the peg.

Inasmuch as the plastic wall sheet 20 is relatively thin and flexible and does not have a great strength there is a need to provide some form of reinforcement of the plastic sheet 20 around the aperture 21. This need is satisfied by the spring clip comprising the subject matter of my invention which is readily attached to the wall 20 through the aperture 21. This clip 38 comprises a sheet portion having a substantially square central portion 40 provided substantially with a rectangular aperture 42 extending lengthwise between the top and the bottom of the clip 38.

According to my invention, to provide a simple means of attaching this reinforcement to the plastic wall or sheet 20, I provide a pair of integral spring arms 44 arranged to grip the edges of the aperture 21 for clamping to the wall or sheet 20. These spring arms 44 extend outwardly from the upper and lower edges of the square shaped portion 40 and are first provided with a circular bend 46 extending through about 120° to 125° forming an acute included angle of about 60°. The spring arms 44 extend from the bends 46 to the second bends 48 which are aligned with but spaced from the top and bottom of the aperture 42. The bends 48 extend through about 45° to 55° and the remaining portion of the arms extend from the bends 48 through the top and bottom of the aperture 42 and project on the opposite sides where they are provided with out-turned end projections 50. The spring arms 44 therefore extend through a substantially triangular shaped loop which is about three-fourths of the complete loop or circle and with the adjacent portion of the central square part 40, form two complete similar triangles extending in opposite directions from the upper and lower portions of the aperture 42. By virtue of their loop shape these spring arms are quite resilient and are arranged to provide a spring force wherein the upper acts upwardly and the lower acts downwardly with both also acting outwardly adjacent their projecting flanged edges 50.

These clips 38 are readily fastened on one side of the wall 20 by merely pushing the spring arms 44 through the aperture 21 in the wall 20 and thereafter releasing them so that the projections can grip the top and bottom edges of the rectangular aperture 21 as is illustrated in FIG. 1. The square-shaped area 40 of the clip may be provided with ribs or various forms of stiffening. However, I prefer to bend the edges of the rectangular area 40 along side the two spring arms 44 for providing flanges 52 along side the outer portions of the spring arms 44. I believe that this clip is well adapted to reinforce the wall 20 around the aperture 21.

After the clip 38 is so applied to the wall 20 it will readily receive a peg support or any other type of fastening or supporting device which may be required. The peg 24 is applied by pushing the anchoring peg portion 32 through the apertures 21 and 42 and then rotating the entire peg until the ends of the U-shaped wire spring lock 34 ride over the side edges of the aperture 42 so as to cause the portion of the wall or sheet 20 around the aperture 21 to be clamped between the square central portion 40 of the clip 38 and the flange 26 upon the peg 24. The projecting portion 28 upon the flange 26 is shaped to enter into the aperture 42 and to fit against the opposite sides of the aperture 42 to resist any further turning movement of the peg 24. The U-shaped spring member 34 is of substantially heavy stiff wire which acts as a holding strut between the surface of the clip and the aperture 36 in the anchoring portion 32 so as to provide a firm holding arrangement which anchors the anchoring portion 32 of the peg 24. This provides a simple, strong, reliable, inexpensive fastening and supporting arrangement well adapted to reinforce walls and sheets which are not well adapted to carry heavy loads and consequently require reinforcement to make them suitable for supporting or anchoring pegs and other types of supports for walls.

While the embodiments of the invention as herein disclosed constitute preferred forms, it is to be understood that other forms might be adopted.

I claim:

1. In combination with a domestic refrigerator inner plastic liner having an elongated rectangular opening, a reinforcement clip for reinforcing an area of said liner around said opening and including a small sheet having a substantially flat central portion adjacent the outer side of said liner, said central portion provided with an aperture for receiving a peg or the like having independent anchoring means to assist in supporting a shelf on said liner, said clip aperture being in the form of an elongated rectangular aperture extending lengthwise between the opposite top and bottom edges of said clip central portion, said rectangular aperture located on the symmetrical axis of said clip central portion and having a longitudinal dimension exceeding the longitudinal dimension of said liner opening; a pair of oppositely oriented identical upper and lower spring arms having parallel side edges extending outwardly from said opposite top and bottom edges, respectively; said spring arms curled about a first circular bend having an included angle of about 30° and a second circular bend having an included angle of about 60° and having a first flat section between said bends, said spring arms aligned on the symmetrical axis of said clip rectangular aperture; said spring arms being of a width slightly less than the width of said clip rectangular aperture; said spring arms first flat sections extending from the first bend inwardly substantially into alignment with said clip aperture and thence being curled sharply about the second bend and having second flat sections extending toward the clip aperture and having end portions extending through the clip aperture provided with out-turned projecting flanged edges adapted to engage opposite edges of said liner opening; said out-turned projecting flanged edges adapted to engage opposite edges of said liner opening; said out-turned projecting flanged edges extending a predetermined distance so as to terminate at a point inwardly of the adjacent transverse edge of the clip aperture; said spring arms extending through substantially three-fourths of a complete triangular-shaped loop to provide a spring force wherein the said upper spring arm flanged edge acts upwardly and said lower spring arm flanged edge acts downwardly against the upper and lower edge portions of said liner opening respectively, said upper and lower spring arms also acting outwardly away from said liner to resiliently adjust in a direction normal thereto and thereby firmly position said clip flat central portion against said liner area for reinforcing same irrespective of the thickness of said liner, said upper and lower spring arm second flat sections being substantially parallel in their secured position providing spacing therebetween substantially greater than the diameter of the peg such that said spring arms secure said clip on said liner independently of the peg anchoring means.

2. The combination as defined in claim 1 in which a set of stiffening flanges extend in said small sheet transversely to and on opposite sides of each of said spring arms.

\* \* \* \* \*

PO-1050
(5/69)

UNITED STATES PATENT OFFICE
CERTIFICATE OF CORRECTION

Patent No. 3,649,059      Dated March 14, 1972

Inventor(s) John W. Davidson

It is certified that error appears in the above-identified patent and that said Letters Patent are hereby corrected as shown below:

The Assignee -- General Motors Corporation, Detroit, Michigan -- should be added.

Signed and sealed this 13th day of February 1973.

(SEAL)
Attest:

EDWARD M. FLETCHER, JR.
Attesting Officer

ROBERT GOTTSCHALK
Commissioner of Patents